US008370614B2

(12) United States Patent
Dalton et al.

(10) Patent No.: US 8,370,614 B2
(45) Date of Patent: Feb. 5, 2013

(54) BOOTING A COMPUTER DEVICE

(75) Inventors: Chris I. Dalton, Bristol (GB); Carl Gebhardt, Saarland (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 338 days.

(21) Appl. No.: 12/608,547

(22) Filed: Oct. 29, 2009

(65) Prior Publication Data

US 2011/0107073 A1 May 5, 2011

(51) Int. Cl.
*G06F 9/00* (2006.01)
*G06F 15/177* (2006.01)

(52) U.S. Cl. .......................................................... 713/2

(58) Field of Classification Search ....................... 713/2
See application file for complete search history.

(56) References Cited

U.S. PATENT DOCUMENTS

| | | | | |
|---|---|---|---|---|
| 6,298,370 | B1 | 10/2001 | Tang et al. | |
| 6,795,966 | B1 | 9/2004 | Lim et al. | |
| 6,865,674 | B1 | 3/2005 | Mancini et al. | |
| 2006/0212939 | A1 * | 9/2006 | England et al. | 726/22 |
| 2008/0126785 | A1 | 5/2008 | Chong et al. | |
| 2009/0064086 | A1 * | 3/2009 | Faus et al. | 717/100 |
| 2009/0125716 | A1 * | 5/2009 | Wooten | 713/164 |

* cited by examiner

*Primary Examiner* — Mohammed Rehman

(57) ABSTRACT

A method of booting a computing device includes, responsive to said computing device powering on, loading a first lightweight operating system on said computing device and executing an instant-on application through said lightweight operating system. The method further includes, during execution of said instant-on application, loading a hypervisor on said computing device and migrating said instant-on application to a first virtual machine executing a second lightweight operating system implemented by said hypervisor. The method further includes loading a full-feature operating system on a second virtual machine implemented by said hypervisor.

20 Claims, 6 Drawing Sheets

BOOTING A COMPUTER DEVICE

BACKGROUND

An operating system for a typical computing device provides an interface to the computing device's hardware accessible by a user and/or programs run by the computing device. The operating system may be responsible for both the management of hardware resources and process control. An operating system typically includes a large amount of code stored that is permanently stored on a non-volatile storage medium such as hard disk or Compact Disc (CD) associated with the computing device. While the use of non-volatile storage media allows the computing device to maintain the code for the operating system even when the computing device is powered off, non-volatile storage media are not fast enough to fetch code for execution by the processor at a rate that efficiently utilizes the processing capabilities of the computing device. Thus, most computing devices execute their operating systems from faster volatile memory, often referred to as the main memory of the computing device.

When such a computing device is first powered on, firmware embedded in the computing device known as a Basic Input Output System (BIOS) is responsible for loading the operating system from its non-volatile storage to the volatile main memory. Once the operating system has been loaded, it can then take control of the various hardware resources associated with the computing device.

As modern operating systems become increasingly complex, they generally take up more storage space. Consequently, the loading process may take more time. For some computing devices, several minutes may pass between the time a user presses the power button to the time that user is able to interact with the computing device. In addition, many features associated with some advanced operating systems such as complex management processes and protection policies may slow down the device. Such delays can be an inconvenience, especially if the user has a quick task to perform on the computing device and/or a limited amount of time. Additionally, if the computing device is a battery-run system such as a laptop, battery power may be wasted while loading elements of the operating system which ultimately will not be needed by the user.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
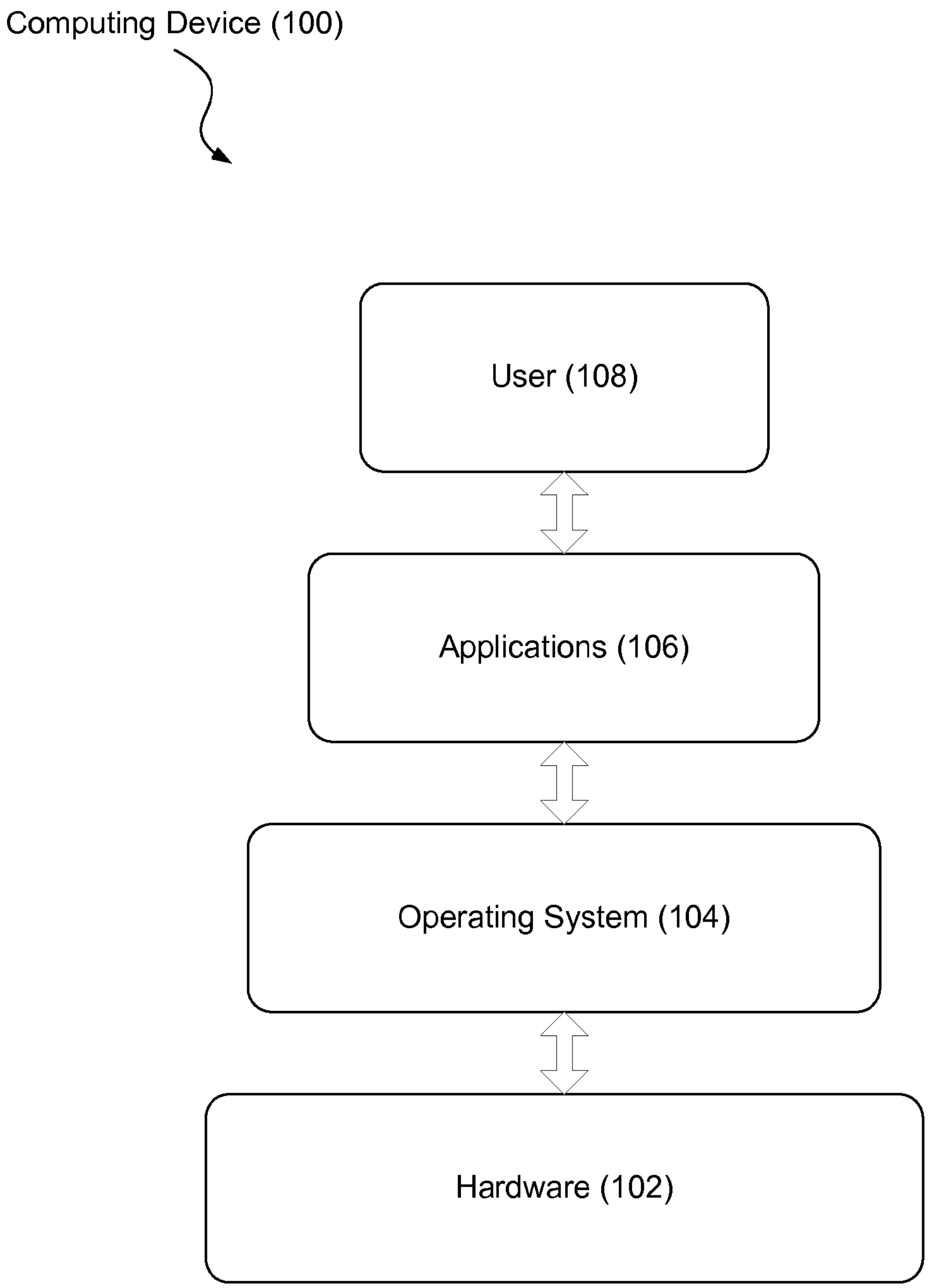
FIG. 1 is a block diagram showing an illustrative abstraction of a computing device, according to one embodiment of principles described herein.

As mentioned above, a typical computing device is run by an operating system which must be loaded from its non-volatile store to main memory when the computing device is first turned on. As modern operating systems become increasingly complex, they generally take up more storage space. Consequently, it takes more time to load them into main memory. From the time a user presses the power button to the time they are able to interact with the system often takes several minutes. This can be an inconvenience, especially if the user has a quick task to perform with the system. Additionally, if the computer system is a battery-run system such as a laptop, battery power may be wasted while loading several elements which will not be needed.

Some systems allow a user the option of loading a smaller operating system which will run only a few applications. These systems may allow a user to quickly access some applications; however, if the user wants to use the full-feature operating system, the system must be rebooted and started up with the full-feature operating system. As mentioned above, this process may take several minutes and may thus be an inconvenience to the user.

In light of these and other considerations, the present specification relates to a system and method for providing an instant-on lightweight operating system that is able to transition to a full-featured operating system. This transition may be transparent to a user. In addition, the user may still be able to interact with the original instant-on application after the system has transitioned to a full-feature operating system. According to one illustrative embodiment, when a computing device is first powered on, a lightweight operating system is loaded. This lightweight operating system may access hardware resources directly. While the lightweight operating system is running, a hypervisor may be loaded. The hypervisor may then run a first virtual machine upon which a second lightweight operating system identical to the lightweight operating system running on the hardware directly is loaded. A second virtual machine may also be loaded onto the hypervisor, upon which a full-featured operating system may be loaded.

In order for a smooth transition to a full featured operating system, the instant-on application running on the lightweight operating system is transferred to the lightweight operating system on the virtual machine. In one embodiment, the state of the instant-on application running on the lightweight operating system may be captured. That state may then be transferred to the instant-on application running on the lightweight operating system on the virtual machine. This process may be completed in milliseconds and is thus unnoticeable to a user.

In some embodiments, the lightweight operating system running on the hardware may be started in a trusted environment using a static root of trust. The lightweight operating system running on the virtual machine may obtain a trusted environment using a dynamic root of trust. Thus, when the instant-on application migrates from the operating system on the hardware to the operating system on the virtual machine, a trusted environment may be maintained.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "lightweight operating system" is to be broadly interpreted as an operating system designed to support only a limited functionality compared to that of a full operating system in the interest of achieving a fast boot time.

Throughout this specification and in the appended claims, the term "instant-on application" is to be broadly interpreted as an application that is capable of being run on a lightweight operating system. For the purposes of the present specification, the term "instant-on application" is intended to encompass both applications originally designed for a standard operating system and applications originally designed for or modified in order to be run on a lightweight operating system.

Throughout this specification and in the appended claims, the term "full-feature operating system" is to be broadly interpreted as an operating system having a full set of features associated with a standard operating system.

Throughout this specification and in the appended claims, the term "virtual machine" is to be broadly interpreted as a software implementation of a computing device that is configured to autonomously execute programs like a physical computing device.

Referring now to the figures, FIG. 1 is a block diagram showing an illustrative abstraction of a computing device (100). According to one illustrative embodiment, a user (108) interacts with various applications (106) implemented by the computing device (100). The applications are run on an operating system (104). The operating system (104) interacts directly with the computing device (100) hardware (102) to accomplish its designed functionality.

The physical electronic components of a computing device (100) are referred to as the system's hardware (102). Hardware (102) often includes, among other things, a processor, memory, and a variety of interface components. The processor is designed to execute instructions in the form of machine code. Some of these instructions may reside in non-volatile memory while the power is off. When the power is first turned on to the computing device (100), various sets of instructions are loaded from the non-volatile memory into the main memory. These sets of instructions may form the operating system (104) and additional programs and applications (104).

As mentioned above, the operating system (104) is an interface to the hardware (102) of the computing device (100) for a user and for applications (106) executed by or in behalf of the user. One function of the operating system (104) is to handle the details involved with operating the system's hardware (102) and other available resources.

The operating system (104) is generally used to run applications (106). Applications (106) include a set of instructions which cause a processor to perform various useful functions for a user. Some examples of applications (106) are web-browsers, email clients, and word processors. These applications (106) are generally written for specific operating systems (104). In this way, the applications (106) do not need to deal with the details of hardware (102) operation directly. Rather, the applications (106) interact directly with the operating system which in turn handles the details of operating the system hardware.

The concept of using a lightweight operating system in conjunction with an instant-on application is known, but prior art systems for providing instant-on applications have the disadvantage of requiring a system reboot when a user desires to transition from the lightweight operating system to a full-feature operating system. As mentioned above, many such full-feature operating systems (104) require several minutes to load before a user is able to interact with the computing device (100). Moreover, the prior art systems provide no way to keep the instant-on application open and running during a transition from the lightweight operating system to the full-feature operating system.

In contrast, the present specification discloses systems and methods for providing instant-on applications with the option to transition to a full-feature operating system without the need to reboot the system or close the instant-on application. These systems and methods will now be described in more detail with reference to FIGS. 2-6.

Figure 2:
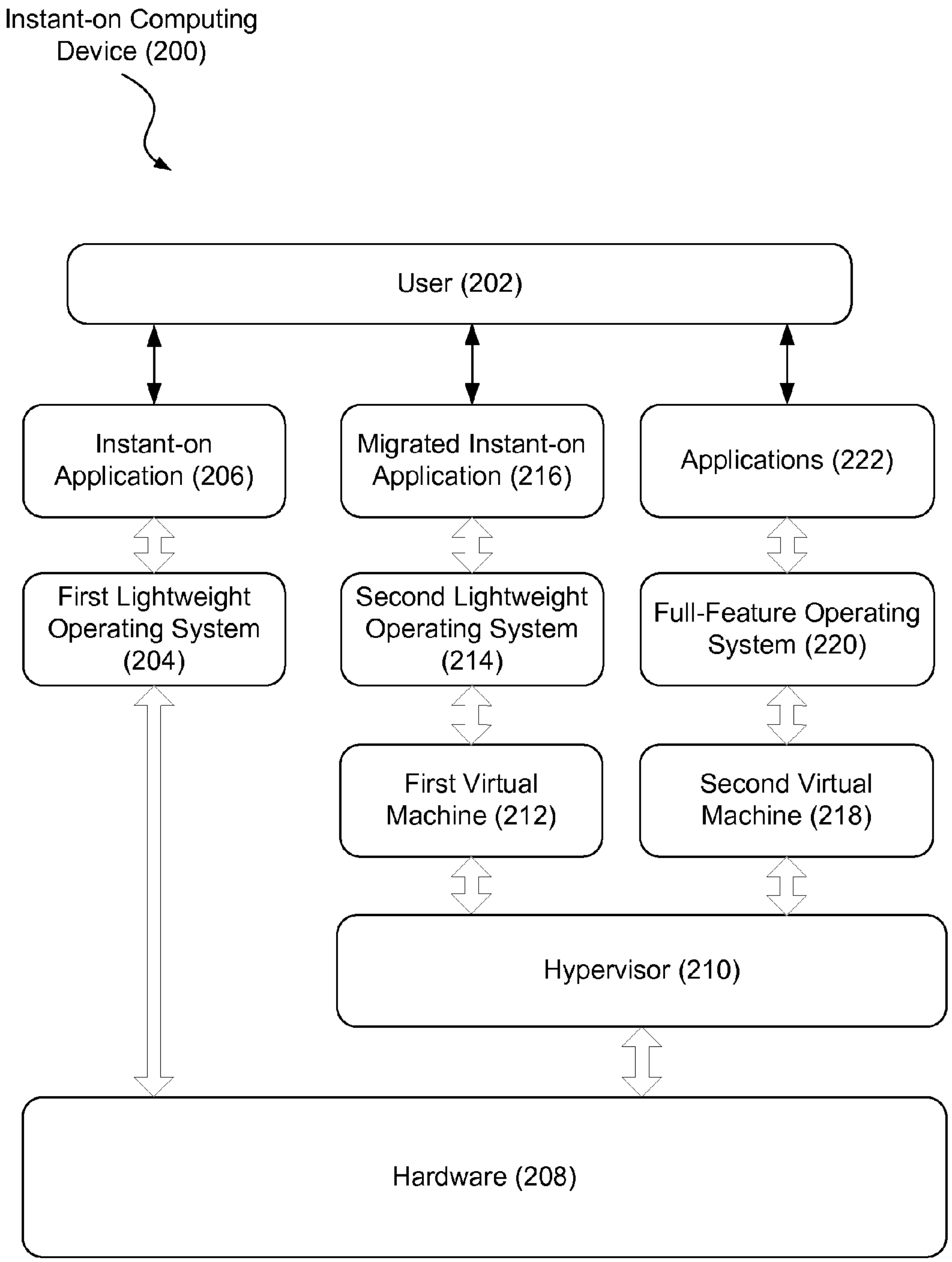
FIG. 2 is a block diagram showing an illustrative computing device having an instant-on operating system with the ability to switch to a full-feature operating system, according to one embodiment of principles described herein.

FIG. 2 is a block diagram showing an illustrative computing device (200) having an instant-on operating system with the ability to switch to a full-feature operating system. According to one illustrative embodiment, a lightweight operating system (204) which runs directly on the hardware (208) is loaded. An instant-on application (206) may then be run by the lightweight operating system (204). While a user (202) interacts with the instant-on application (206), a hypervisor (210) may be loaded on the hardware (208) in the background. A first virtual machine (212) may then be implemented by the hypervisor (210). A second lightweight operating system (214) may then be loaded onto the first virtual machine (212). The lightweight operating system (214) on the first virtual machine (212) may be similar to the lightweight operating system (204) running directly on the hardware (208). In addition, a second virtual machine (218) may be implemented by the hypervisor (210). A full-feature operating system (220) may then be loaded onto the second virtual machine (218).

A lightweight operating system (204) is a simplified version of a standard operating system. A lightweight operating system (204) may be specifically designed to handle a single application or type of application. For example, a lightweight operating system (204) may be designed to only run a web-browser. This type of lightweight operating system (204) would only need to manage the hardware (208) necessary for web-browsing. The required hardware (208) for operating a web-browser may include, but is not limited to, a graphical display, a keyboard, a mouse, and a network interface card. The lightweight operating system (204) does not need to load an extensive amount of features and programs that are typically loaded with a standard operating system. This allows the lightweight operating system (204) to load in a much smaller amount of time. In addition, the reduced code base of a lightweight operating system may provide additional security.

The lightweight operating system (204) may be configured to run directly on the hardware (208). That is, the lightweight operating system (204) will make direct references to hardware resources. Additionally, instructions will be processed by the physical processor. Referencing hardware (208) directly requires a relatively small amount of software. Thus a relatively small amount of data will need to be loaded into main memory upon startup of the computing device. Consequently, a faster startup time may be achieved.

As mentioned above, an instant-on application (206) may be an original application or a modified version of its original application. For example, an email client may be a simple enough application to run on a lightweight operating system (204) that it does not need to be modified. Other types of email clients may have an extensive amount of features. In this case, it may be useful to create a simpler version of the email client for use on a lightweight operating system (204).

A hypervisor (210) is a virtual machine monitor program. A hypervisor (210) may allow multiple operating systems (214, 220) to run on the same hardware (208). Each operating system is run on what is referred to as a virtual machine (212, 218). A virtual machine (212, 218) is a software program that emulates physical hardware (208). Thus an operating system running on a virtual machine (212, 218) behaves as though it is referencing hardware (208) directly while in actuality it is interacting with the virtual machine software. The virtual machine (212, 218) then uses the hypervisor (210) to utilize the physical hardware (208) to perform whatever tasks may be needed.

The second lightweight operating system (214) is similar to the first lightweight operating system (204). One difference is that the first lightweight operating system (204) is run directly on the hardware (208) while the second lightweight operating system (214) is run on a virtual machine (212). Because the process of loading the second lightweight operating system (214) onto the virtual machine (212) may be performed in the background, a user (202) may be unaware of its occurrence.

After the second lightweight operating system (214) has been loaded onto a virtual machine (212), the instant-on application (206) running on the first lightweight operating system (204) may then be migrated to the second lightweight operating system (214) running on a virtual machine (212). The migrated instant-on application (216) may then continue to operate as normal. A more detailed discussion of the migration process will be discussed below.

In addition to a virtual machine being implemented by the hypervisor (210) to run the second lightweight operating system (214), a second virtual machine (218) may be implemented by the hypervisor (210). A full-feature operating system (220) may then be loaded onto the second virtual machine (218). This process may occur either automatically or in response to an action performed by a user (202). Once the full-featured operating system (220) has finished loading, the user (202) may have the option to transition over to the full-feature operating system (204). The user (202) may still be able to interact with the instant-on application (206, 216) which he or she was using when the computing device was first powered on. In addition, the user may have full access to all the resources and applications (222) available with the full-feature operating system (220).

Figure 3:
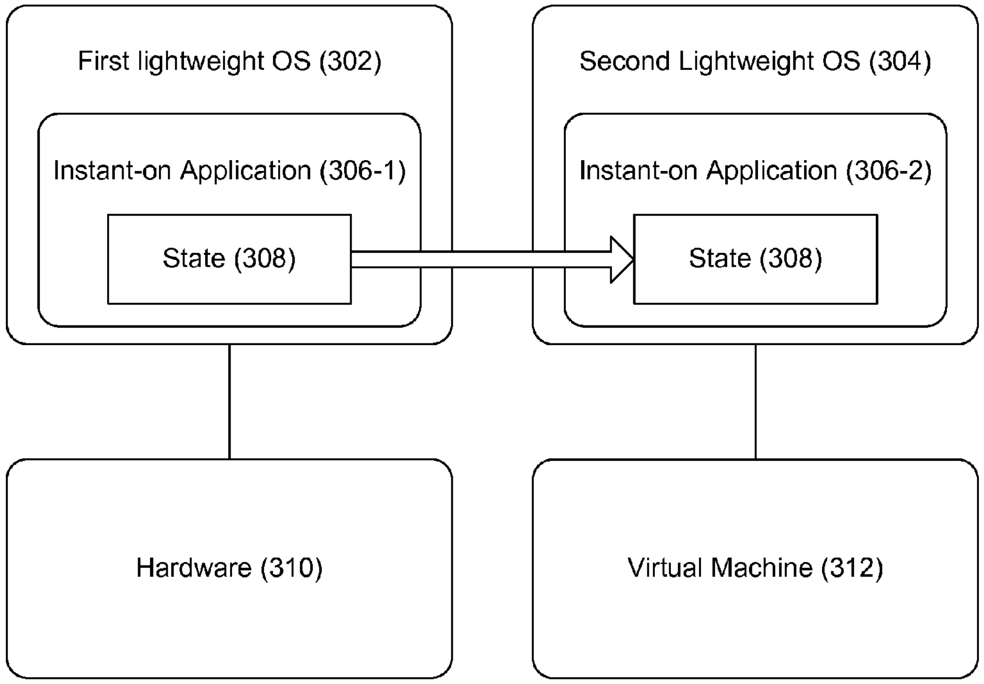
FIG. 3 is a block diagram illustrating the migration of an application from one operating system to another, according to one embodiment of principles described herein.

FIG. 3 is a block diagram illustrating the migration of an application from one operating system to another. According to one illustrative embodiment, the state (308) of a first instance of the instant-on application (306-1) running on the first lightweight operating system (302) referencing hardware (310) directly is transferred to a second instance of the instant-on application (306-2) running on the lightweight operating system (304) on a virtual machine (312).

In order to migrate from the lightweight operating system (302) running directly on hardware (310) to the lightweight operating system (304) running on the virtual machine (312), both operating systems (302, 304) may be synchronized through a synchronization process. The state (308) of the first instance of the instant-on application (306-1) may then be captured and transferred to the second instance of the instant-on application (306-2) executed by the second lightweight operating system (304). The state (308) may include the status of a variety of variables involved with the execution of the instant-on application. The state (308) may also include the state of the operating system kernel. The state may then be copied and applied to the lightweight operating system (304) on the virtual machine (312). The second instance of the instant-on application (306-2) may then resume the functionality of the first instance of the instant-on application (306-1) on the lightweight operating system (304) running on the virtual machine (312) presentation of the hardware. This process may occur in milliseconds and may thus be transparent to a user.

Figure 4:
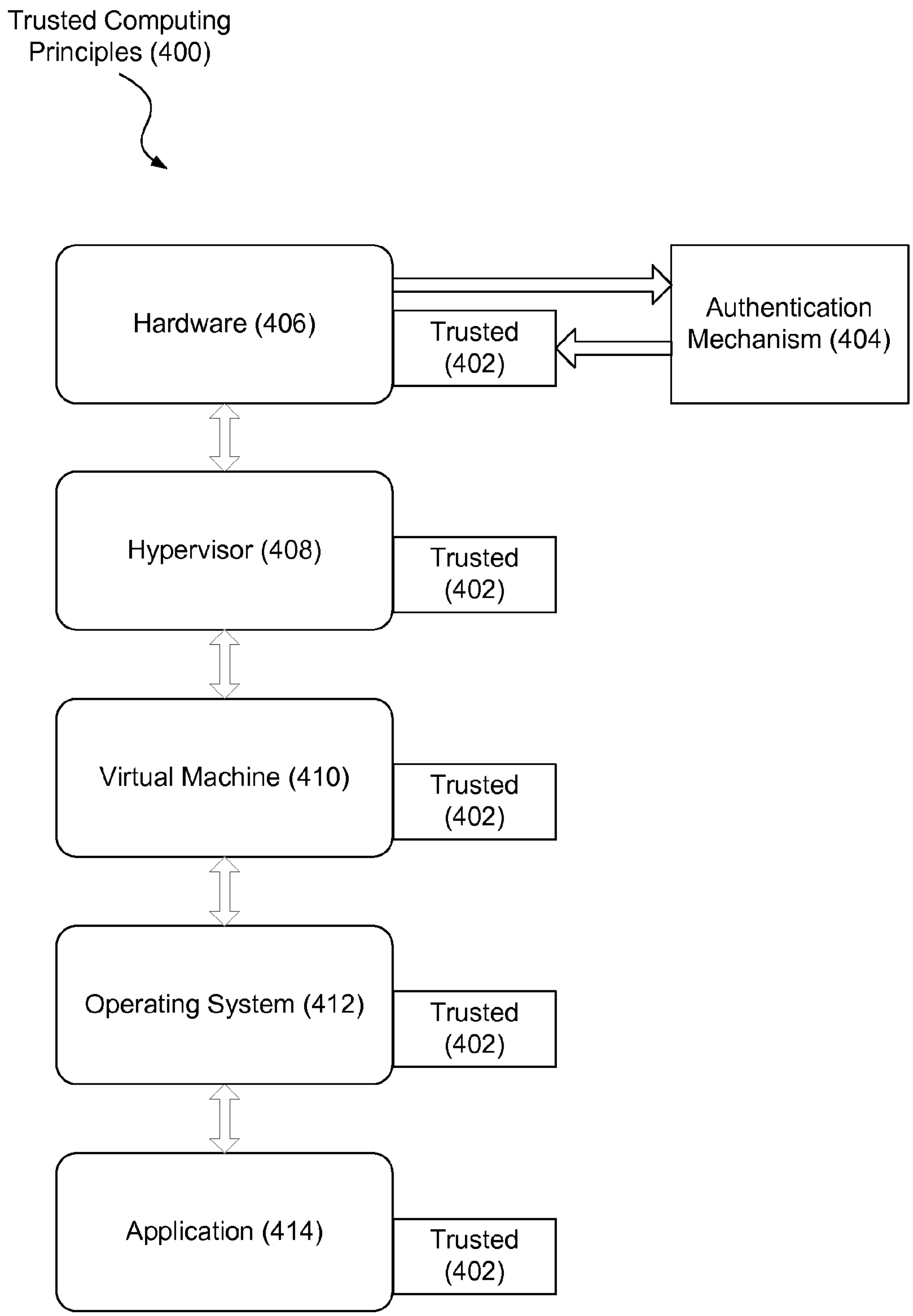
FIG. 4 is a diagram showing illustrative trusted computing for a computing device, according to one embodiment of principles described herein.

FIG. 4 is a diagram showing illustrative trusted computing (400) for a computing device. According to one illustrative embodiment, hardware may (406) be authenticated through an authentication mechanism (404). After the authentication process, the hardware (406) may be said to be trusted (402). This trust (402) may then be inherited by any process begun by the hardware (406).

A trusted system is a system which has been authenticated through some means as legitimate. This means that the software has not been modified in a prohibited manner. The authentication process assures that hardware or software has not been altered by a malicious entity. As will be appreciated by those skilled in the relevant art, the authentication may include remote attestation, digital signatures, and public/private key techniques. A discussion of such authentication processes is beyond the scope of this specification, thus a detailed description will not be given.

An authenticated or trusted (402) set of hardware (406) may be configured to only load trusted (402) pieces of software. Thus, the hardware may only load a hypervisor (408) if the hypervisor (408) is trusted 9402). Because the hardware (406) will only load trusted (402) pieces of software, it may be assumed that any program loaded by a trusted (402) set of hardware (406) is likewise trusted (402). Similarly, because the hypervisor (408) is trusted (402), it will only implement a virtual machine (410) that is trusted (402). Thus, any virtual machine (410) implemented by a hypervisor (408) may be assumed to be trusted (402). This process of inherited trust may continue through the operating system (412) and to any applications (414).

Because the hardware (406) is the first to be trusted (402) and all other levels depend on assuming that the hardware (406) is trusted (402), the hardware (406) may be referred to as the root of trust. A root of trust may be either static or dynamic. A system with a static root of trust is one in which the root of trust is authenticated when the system is first powered on. A system with a dynamic root of trust is one in which the trust process may occur at a later time. For example, after a system has been powered on and everything has been loaded, an authentication process may be initiated for a virtual machine (410). The virtual machine (410) will then verify that an operating system (412) running thereon is trusted (402). In turn, the operating system (412) may verify that any applications it is running are trusted (402).

In one embodiment of the operating system transitioning process described herein, each lightweight operating system and the full-feature operating system may be trusted (402). This trust may be maintained as the instant-on application migrates from the lightweight operating system running directly on the hardware to the lightweight operating system running on a virtual machine. The computing device may employ either a static root of trust mechanism and/or a dynamic root of trust mechanism.

In one embodiment, a static root of trust mechanism may be used for the lightweight operating system running directly on the hardware and a dynamic root of trust mechanism may be used for the lightweight operating system running on a virtual machine. The dynamic root of trust mechanism may be initiated before or during the migration of the instant-on application.

Figure 5A:
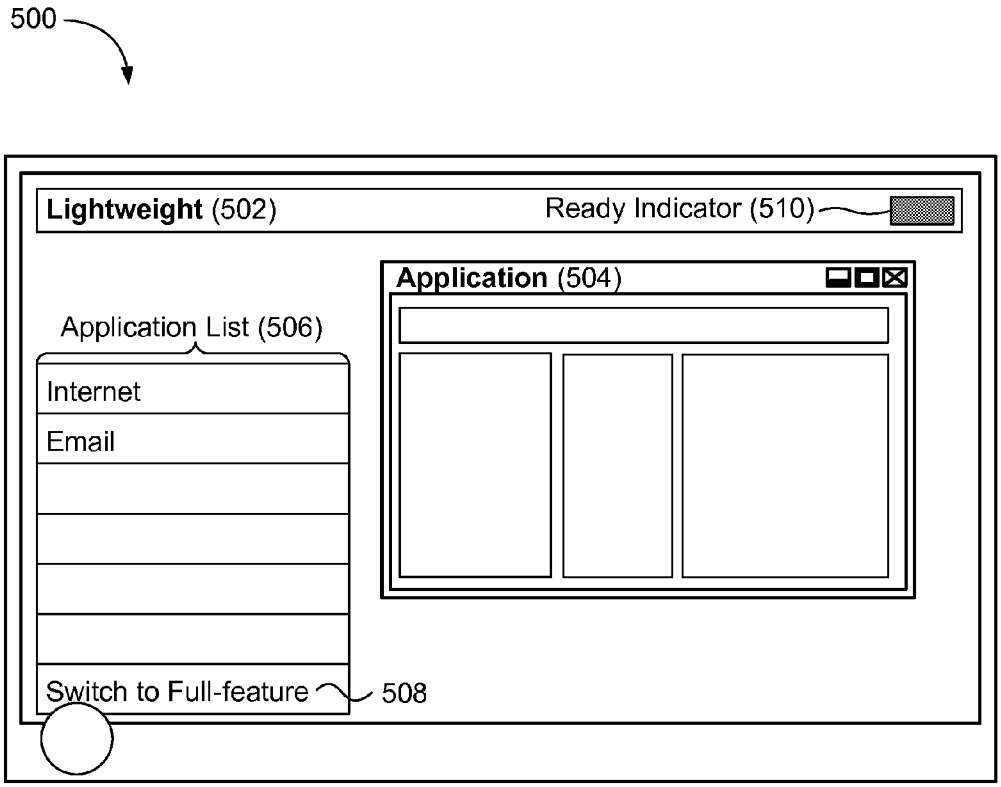
FIGS. 5A and 5B are diagrams showing an illustrative user interface for an operating system, according to one embodiment of principles described herein.
Figure 5B:
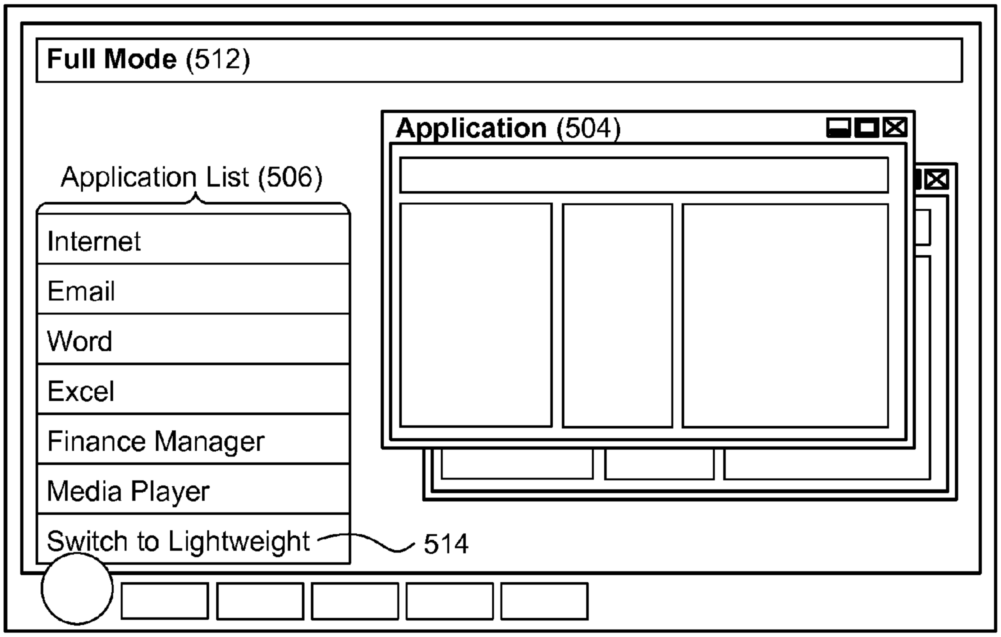

FIGS. 5A and 5B are diagrams showing an illustrative user interface for an operating system. FIG. 5A is an example of an illustrative user interface of a lightweight operating system (502). According to one illustrative embodiment, the user interface (500) may include an instant-on application (504), an application list (506), a means (508) to switch to a full-feature operating system, and a ready indicator (510).

In one embodiment, the lightweight operating system (502) may be designed for one specific instant-on application. For example, a lightweight operating system may be designed specifically for web-browsing. In this case, the lightweight operating system would contain only the necessary software to run a web-browser. In some embodiments, a lightweight operating system (502) may be designed to accommodate several types of instant-on applications. In these cases, the lightweight operating system may be designed to let a user choose which instant-on applications should be available. The lightweight operating system may then only load the necessary software components which are needed to run the instant-on applications chosen by the user. An application list (506) may be displayed to a user, indicating which instant-on applications are currently available.

When a user wishes to switch from the lightweight operating system to the full-feature operating system, the user may then select an option to make the switch (508). Because this switch requires that the hypervisor and the full-feature operating system be loaded in the background, the user may have to wait until the full-feature operating system is fully loaded before the switch can occur. Additionally, the instant-on application will have to be migrated to the lightweight operating system running on a virtual machine. A ready indicator (510) may be provided to indicate to the user that it is currently possible to switch to a full-feature operating system.

FIG. 5B is an example of an illustrative user interface (500) for a full-feature operating system (512). According to one illustrative embodiment, the user interface for the full-feature operating system may include a more extensive application list, and a means (514) to switch to a lightweight operating system (502).

In addition to the instant-on application (504) the user was initially interacting with upon startup of the computing device, the user may have access to a variety of full-feature applications once the system has transitioned to a full-feature operating system (512). The application list (506) may then contain all of the available applications on the system.

If a user so desires, he or she may choose to transition back to the lightweight operating system. A means (514) may be provided through the user interface (500) to allow the user to make this transition. A user may choose to revert back to a lightweight operating system (502) to conserve power. This may be especially beneficial for portable battery-run computing devices. In addition, when the user is finally ready to shutdown the computing device, it will take a lot less time to shutdown from the lightweight operating system (502) then from a full-feature operating system (512).

Figure 6:
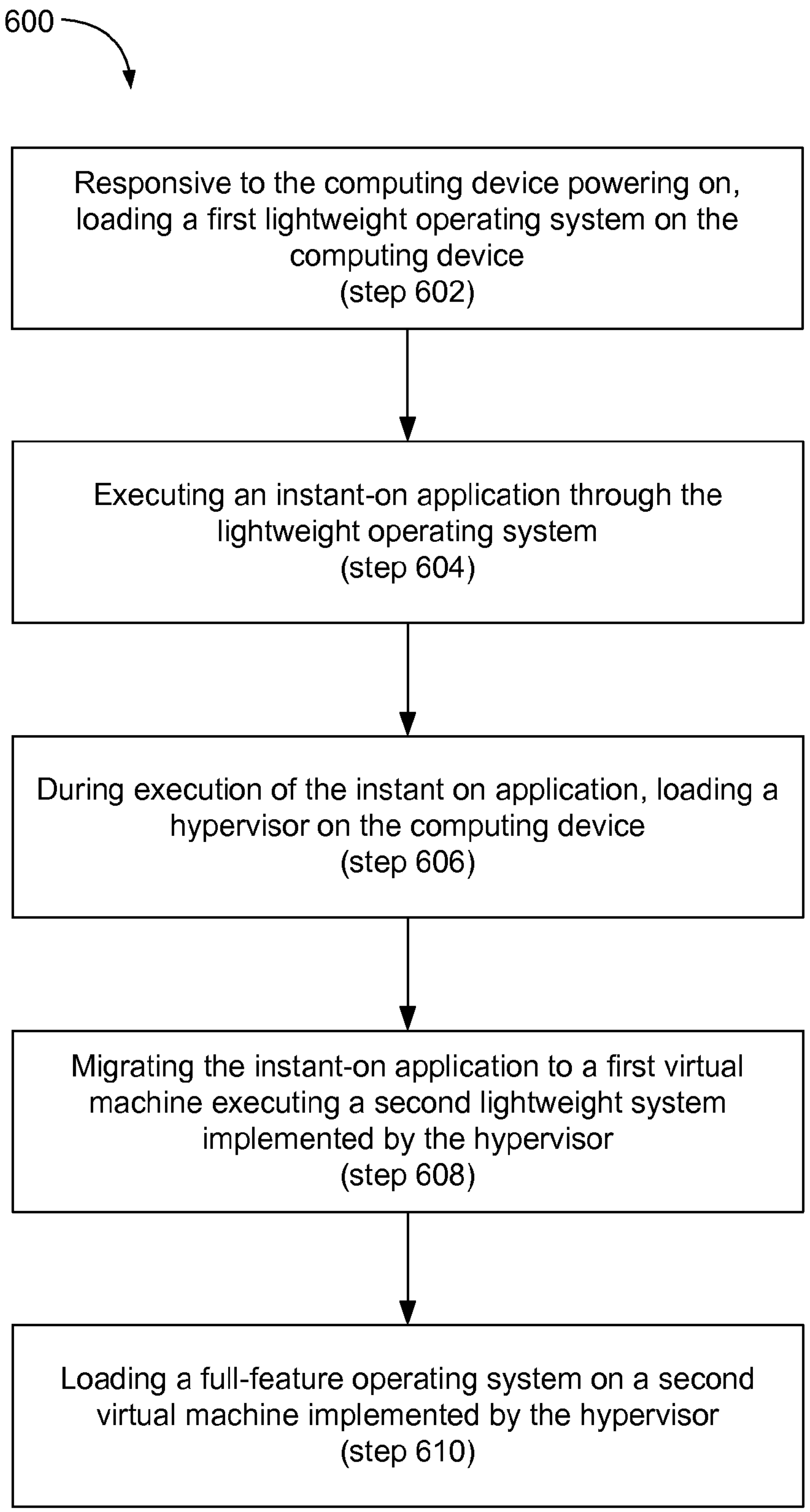
FIG. 6 is a flow chart showing an illustrative method for providing an instant-on operating system with the ability to switch to a full-feature operating system, according to one embodiment of principles described herein.

FIG. 6 is a flow chart showing an illustrative method (600) for providing an instant-on operating system with the ability to switch to a full-feature operating system. According to one illustrative embodiment, a first lightweight operating system may be loaded (step 602) onto a computing device in response to the computing device being powered on. An instant-on application may then be executed (step 604) through the lightweight operating system. During execution of the instant-on application, a hypervisor may be loaded (step 606) onto the computing device. The instant-on application may be migrated (step 608) to a first virtual machine which is executing a second lightweight operating system implemented by the hypervisor. A full-feature operating system may be loaded (step 610) onto a second virtual machine implemented by the hypervisor.

In sum, a lightweight instant-on operating system may transition to a full-feature operating system without requiring a restart of the system. This is done by having the full-feature operating system load in the background while a user is able to interact with any instant-on applications available on the lightweight operating system. In this way, a user does not waste several minutes of time and power while waiting for a system to start up. In addition, a trusted environment may be maintained during the transition.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of booting a computing device, the method comprising:

responsive to said computing device powering on, loading a first lightweight operating system on said computing device and executing an instant-on application through said lightweight operating system;

during execution of said instant-on application, loading a hypervisor on said computing device and migrating said instant-on application to a first virtual machine executing a second lightweight operating system implemented by said hypervisor; and loading a full-feature operating system on a second virtual machine implemented by said hypervisor.

2. The method of claim 1, in which said loading a hypervisor on said computing device and a creation of said first and second virtual machines occurs in response to an action performed by a user.

3. The method of claim 1, in which said migrating said instant-on application to said first virtual machine comprises:

capturing a state of a first instance of said instant-on application being executed by said first lightweight operating system; and transferring said state of said first instance of said instant-on application from said first lightweight operating system to a second instance of said instant-on application executed by said second lightweight operating system.

4. The method of claim 3, further comprising transitioning from said second lightweight operating system running on said first virtual machine to said fully functional operating system running on said second virtual machine while still running said instant-on application in said first virtual machine.

5. The method of claim 4, in which said transition occurs automatically.

6. The method of claim 4, in which said transition occurs in response to an action performed by a user.

7. The method of claim 4, further comprising, transitioning back from said full-feature operating system running on said second virtual machine to said second lightweight operating system running on said first virtual machine.

8. The method of claim 1, further comprising, establishing a trusted environment within said first lightweight operating system using a static root of trust.

9. The method of claim 8, further comprising, establishing a trusted environment within said second lightweight operating system using a dynamic root of trust.

10. The method of claim 9, further comprising, maintaining said trusted environment while migrating said state of said instant-on application from said first lightweight operating system to said second lightweight operating system.

11. A computing device comprising:

a processor; and computer readable memory communicatively coupled to said processor;

in which said processor is configured to:

responsive to said computing device powering on, load a first lightweight operating system on said computing device and execute an instant-on application through said lightweight operating system;

during execution of said instant-on application, load a hypervisor on said computing device and migrate said instant-on application to a first virtual machine executing a second lightweight operating system implemented by said hypervisor; and load a full-feature operating system on a second virtual machine implemented by said hypervisor.

12. The device of claim 11, in which said processor is configured to migrate said instant-on application to said first virtual machine by:

capturing a state of a first instance of said instant-on application being executed by said first lightweight operating system; and transferring said state of said first instance of said instant-on application from said first lightweight operating system to a second instance of said instant-on application being executed by said second lightweight operating system.

13. The device of claim 11, in which said processor is configured to load said hypervisor on said computing device and create said first and second virtual machines in response to an action performed by a user.

14. The device of claim 11, in which said processor is further configured to transition from said second lightweight operating system running on said first virtual machine to said full-feature operating system running on said second virtual machine while still running said instant-on application.

15. The device of claim 14, in which said transition occurs automatically or in response to an action performed by a user.

16. The device of claim 14, in which said processor is further configured to transition back from said full-feature operating system running on said second virtual machine to said second lightweight operating system running on said first virtual machine.

17. The device of claim 11, in which said processor is further configured to establish a trusted environment within said first lightweight operating system using a static root of trust.

18. The device of claim 17, in which said processor is further configured to establish a trusted environment within said second lightweight operating system using a dynamic root of trust.

19. The device of claim 18, in which said processor is further configured to maintain said trusted environment while migrating said state of said instant-on application from said first lightweight operating system to said second-lightweight operating system.

20. A method of booting a computing device in a trusted environment, the method comprising:

responsive to said computing device powering on, loading a first lightweight operating system in a trusted environment on said computing device and executing an instant-on application through said lightweight operating system;

during execution of said instant-on application, loading a hypervisor on said computing device and migrating said instant-on application to a first virtual machine executing a second lightweight operating system run in a trusted environment implemented by said hypervisor; and loading a full-feature operating system run in a trusted environment on a second virtual machine implemented by said hypervisor;

in which said trusted environment is maintained during said migrating said instant-on application to said first virtual machine executing said second lightweight operating system.

* * * * *